United States Patent
Pujic

(10) Patent No.: US 8,917,720 B2
(45) Date of Patent: Dec. 23, 2014

(54) SYSTEM AND METHOD FOR INTEGRATING CONVENTIONAL ENTERPRISE COMMUNICATION SYSTEMS INTO AN IP MULTIMEDIA SUBSYSTEM-BASED SERVICES ENVIRONMENT

(75) Inventor: Milos Pujic, Belleville (CA)

(73) Assignee: Avaya Inc., Basking Ridge, NJ (US)

( * ) Notice: Subject to any disclaimer, the term of this patent is extended or adjusted under 35 U.S.C. 154(b) by 605 days.

(21) Appl. No.: 13/114,836

(22) Filed: May 24, 2011

(65) Prior Publication Data

US 2012/0195303 A1 Aug. 2, 2012

Related U.S. Application Data

(60) Provisional application No. 61/437,793, filed on Jan. 31, 2011.

(51) Int. Cl.
*H04L 12/66* (2006.01)

(52) U.S. Cl.
USPC .................................. 370/352; 370/354

(58) Field of Classification Search
CPC ............ H04L 65/1006; H04L 65/1016; H04L 65/1053; H04L 65/1063; H04L 65/105
See application file for complete search history.

(56) References Cited

U.S. PATENT DOCUMENTS

| | | | |
|---|---|---|---|
| 6,307,853 B1 * | 10/2001 | Storch et al. ............... | 370/354 |
| 8,064,951 B2 * | 11/2011 | Woodson et al. ........... | 455/555 |
| 8,126,130 B1 * | 2/2012 | Ozugur et al. ............ | 379/207.02 |
| 8,451,841 B2 * | 5/2013 | Siegel et al. .............. | 370/392 |
| 2004/0057568 A1 * | 3/2004 | Kawabata et al. ......... | 379/220.01 |
| 2005/0111634 A1 * | 5/2005 | Didcock et al. ............ | 379/88.22 |
| 2007/0121866 A1 * | 5/2007 | Kniveton et al. .......... | 379/201.1 |
| 2008/0159515 A1 * | 7/2008 | Rines ....................... | 379/221.08 |
| 2008/0194258 A1 * | 8/2008 | Chiu et al. ................ | 455/435.1 |
| 2009/0116634 A1 * | 5/2009 | Levin et al. .............. | 379/221.01 |
| 2010/0111079 A1 * | 5/2010 | Duffy et al. .............. | 370/352 |
| 2010/0128716 A1 * | 5/2010 | Lu et al. ................... | 370/352 |
| 2011/0281580 A1 * | 11/2011 | Tonogai et al. ........... | 455/426.1 |
| 2011/0305238 A1 * | 12/2011 | Ikuta et al. ................ | 370/352 |
| 2012/0069765 A1 * | 3/2012 | Soto ......................... | 370/252 |
| 2013/0089014 A1 * | 4/2013 | Duffy et al. .............. | 370/310 |
| 2013/0101105 A1 * | 4/2013 | Karnalkar et al. ......... | 379/198 |

OTHER PUBLICATIONS

Cisco Mobile Office: A Flexible, Feature-Rich Fixed-Mobile Communications Solution. [online], [retrieved on May 26, 2011]. Retrieved from the Internet: ,URL:www.cisco.com..en US solutions collateral ns341 ns523 ns519 solutions_overview_cisco_mobile_office_flexible_feature_rich_fixed_mobile_communications_solution.html>.

Broadworks Mobile Max. Document Transcript [online], [retrieved on May 26, 2011]. Retrieved from the Internet: <URL:http://www.slideshare.net/fantastic1/broadworks-mobilemax>.

(Continued)

*Primary Examiner* — Phirin Sam
(74) *Attorney, Agent, or Firm* — Christopher & Weisberg, P.A.

(57) ABSTRACT

A system and method for integrating conventional enterprise communication systems into an IMS-based services environment are disclosed. In one embodiment, when a call request is received for a call between first and second local users of a PBX, the PBX determines whether a class of service for either the first or second local user is for Exposed Local Call (ELC) processing. If so, then call information is routed through a Session Initiation Protocol (SIP) core network that is coupled to an Internet Protocol Multimedia Subsystem (IMS) server to provide IMS services to the call.

20 Claims, 3 Drawing Sheets

(56) References Cited

OTHER PUBLICATIONS

Multi-PBX Integration/Branch Office Solutions [online], [retrieved on May 26, 2011]. Retrieved from the Internet: <URL:http://www.sonusnet.com solutions solutions-for-enterprisesmultipbx-integrationbranch-office.aspx>.

P. Carden. Enterprise Mobility. 'Why a compelling end-user experience demands integration of network-based and premises-based solutions.' Alcatel-Lucent [online], [retrieved on May 26, 2011]. Retrieved from the Internet: <URL:http://www.alcatel-lucent.com/enrich/v1i22007/article_c4a1.html>.

Nokia Siemens Networks Rich Communication Reinvent How We Communicate, Slideshow Presentation [online], Transformation Forum—Germany, Mar. 26, 2009, Cologne, [retrieved on May 26, 2011]. Retrieved from the Internet: <URL:http www.nsn-transformation.com uploads documents DU_demonstration Rich_Communications_IMS.pdf>.

* cited by examiner

SYSTEM AND METHOD FOR INTEGRATING CONVENTIONAL ENTERPRISE COMMUNICATION SYSTEMS INTO AN IP MULTIMEDIA SUBSYSTEM-BASED SERVICES ENVIRONMENT

CROSS-REFERENCE TO RELATED APPLICATION

This application is related to and claims priority to U.S. Provisional Patent Application Ser. No. 61/437,793, filed Jan. 31, 2011, and entitled Method And System For Integrating Conventional Enterprise Communication Systems Into An IP Multimedia Services Based Environment, the entirety of which is incorporated herein by reference.

STATEMENT REGARDING FEDERALLY SPONSORED RESEARCH OR DEVELOPMENT n/a

FIELD OF THE INVENTION

The present invention relates to telecommunications, and in particular to a method and system for integrating conventional enterprise communication systems into an Internet Protocol (IP) Multimedia Subsystem (IMS)-based services environment.

BACKGROUND OF THE INVENTION

An IP Multimedia Subsystem (IMS) architecture defines an application server (AS) and a mechanism that allows multiple application servers to deliver services to a single communication session. Each application server implements a half-call model. The half-call model separates two phases of processing of a call session: the originating phase and the terminating phase. When an application service is invoked, services supplied by the application service depend upon which phase of the call is being processed. During the originating phase application services are provided based on a service profile of the session originator. During the terminating phase, application services are provided based on a service profile of the session terminator.

Session Initiation Protocol (SIP) is the communication protocol typically used for communication between the application servers and the IMS infrastructure. Although many conventional enterprise communication systems—such as Private Branch Exchanges (PBX)—support SIP, an IMS collaborative call processing procedure is not supported by these conventional systems. For example, a conventional PBX implements a full-call model that has no distinct separation of the call into originating and terminating sessions. Thus, a conventional PBX user cannot receive IMS services. This is a significant obstacle to migration of legacy PBX systems to IMS architecture.

Several attempts to address this problem have been proposed. In one attempted solution, a concept of an implicit user is introduced which is defined by a service profile for the originating phase and for the terminating phase. This facilitates the delivery of IMS services from a SIP core to a conventional PBX user. However, calls between two users hosted by the same PBX, i.e., local calls, are not provided to the SIP core for processing. As a result, IMS services cannot be applied to local calls.

Another attempt allows for exposing all calls to the IMS applications while internally maintaining full call model processing. Externally, a communication manager-evolution server (CM-ES) implements an emulation of the half call model. Unfortunately, this solution is applicable only to users that have SIP clients and have IMS line service configured. The solution fails to address the problem presented by a conventional PBX using traditional Time Division Multiplex (TDM) or proprietary clients.

Yet another approach applies digit manipulation and special routing rules to PBX calls so that every call of a PBX user is routed via the IMS SIP core and is thus accessible or "exposed" to IMS application servers. This approach has several drawbacks. First, the approach results in a complex PBX configuration that is prone to routing loops and is difficult to maintain. Second, the digit manipulation and routing via external trunks adversely impacts the information displayed at a client's phone display. Third, the approach does not provide appropriate information to IMS applications in the event of call modifications that occur as a result of executing PBX functions such as call transfer and ad-hoc conferencing. Fourth, the approach is not easily scalable since the configuration changes can rarely be implemented for a single user or a small number of users. Also note that with this approach, a local call consumes two SIP virtual trunks. The maximum number of SIP virtual trunks is limited and licensed, thus running the risk of exhausting available resources in case the configuration changes apply to all PBX users.

Therefore, there is a need for a method and system that provides a scalable and manageable way to integrate conventional enterprise communication systems into an IMS-based services environment.

SUMMARY OF THE INVENTION

The present invention advantageously provides a method and system for call processing. According to one aspect, a call processing method includes receiving a request for a call between a first end user local to a PBX and a second end user local to the PBX. A determination is made as to whether a class of service for either the first end user or the second end user is Exposed Local Call (ELC). When a class of service for either the first end user or the second end user is Exposed Local Call (ELC), the call is routed through a Session Initiation Protocol (SIP) core that is in communication with an Internet Protocol Multimedia Subsystem (IMS) application server to enable IMS services for the call.

In some embodiments, a method may also include determining whether a dedicated virtual ELC line pair connecting the PBX to the SIP core is available for the call. When a dedicated ELC line pair connecting the PBX to the SIP core is not available for the call, then the call is routed through the PBX without routing the call to the SIP core and without enabling IMS services for the call. Also, in some embodiments, when a class of service for the first end user and the second end user is not ELC, then the call is routed through the PBX without routing the call to the SIP core and without enabling IMS services for the call.

According to another aspect, the invention provides a telecommunications system. A session initiation protocol (SIP) core exposes PBX calls having an Exposed Local Call (ELC) class of service to IP Multimedia Subsystem (IMS) services. An IMS application server provides IMS services to the calls routed through the SIP core. A PBX has a memory and a processor in communication with the memory. The memory stores a list of end users that have Exposed Local Call (ELC) class of service and a list of ELC line pairs connecting the PBX with the session initiation protocol (SIP) core. The processor receives a request for a call session between a first end user local to the PBX and a second end user local to the PBX, determines whether a class of service for either the first end user or the second end user is Exposed Local Call (ELC), and when a class of service for at least one of the first end user and the second end user is ELC, then routing the call through the SIP core.

In some embodiments the routing of the call through the SIP core enables a first set of IP Multimedia Subsystem (IMS) services to be associated with an originating phase of the call and a second set of IMS services to be associated with a termination phase of the call, without control of the phases by the PBX. In some embodiments, the services are implemented without control of the implementation of the services by the PBX.

According to another aspect, the invention provides a PBX having a processor. The processor operates to determine when a user associated with a call originating at the PBX and terminating at the PBX is a user having an Exposed Local Call (ELC) class of service, and to establish a first leg and a second leg between the PBX and a session initiation protocol (SIP) core when either of the users has the ELC class of service.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
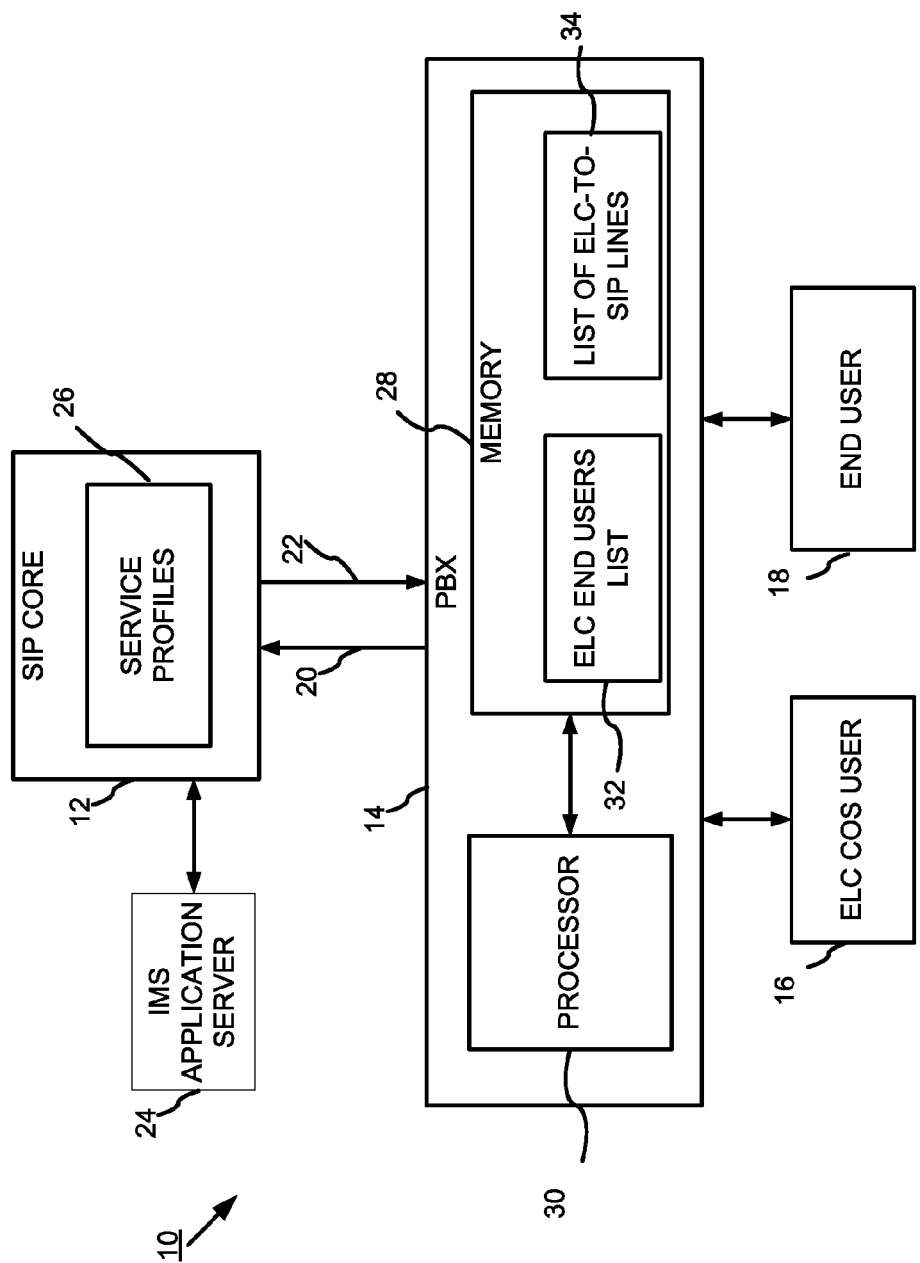
FIG. 1 is a block diagram of a communication system constructed in accordance with principles of the present invention.

Before describing in detail exemplary embodiments that are in accordance with the present invention, it is noted that the embodiments reside primarily in combinations of apparatus components and processing steps related to implementing a system and method for call processing. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

The invention employs a PBX that has a call processing schema that minimizes having a PBX administrator implement time consuming, error prone PBX configuration changes. In embodiments of the invention, administration tasks related to IMS enablement of the PBX can be reduced to checking a check box in an individual user profile. A proposed process is referred to as Exposing Local Calls (ELC). The ELC process allows IMS services to be provided in cases where the call is local to the PBX. IMS services include call waiting, call forwarding, call conferencing, call screening, call blocking, calling party name/number control, call recording, call conferencing, preferential routing, etc. The IMS services that are available depend on whether the call is in an origination phase or a terminating phase. IMS services available during the origination phase include call blocking, calling party name/number control, call recording, preferential routing, etc. IMS services available during the termination phase include call waiting, call forwarding, call screening, call recording, call conferencing etc.

Features of the process described herein include a new PBX class of service (COS) that applies to a PBX line of any type, including analog, digital, proprietary Internet Protocol (IP) and SIP. The proposed ELC processing applies only to local calls, that is, calls that originate from a PBX user and that terminate at another user of the same PBX.

The presence of ELC COS on either the originating or terminating PBX line triggers the ELC processing described herein. A dedicated pool of virtual SIP line pairs (also referred to as. virtual trunks) is reserved for exclusive use of ELC processed calls. A licensing mechanism can be used to control deployment of ELC lines and trunks. When ELC resources are exhausted based on capacity or licensing, the call may be processed as a "regular" local call. Also, if access from the PBX to the SIP core is not available due to connectivity or hardware problems, the call may be processed as a regular local call.

Each ELC call may be treated as consisting of two SIP call legs: outgoing and incoming. ELC SIP trunks are used to support the two call legs. An outgoing ELC call leg is routed via an ELC SIP trunk to the SIP core. An incoming ELC call leg from the SIP core is presented to the PBX as an ELC SIP trunk. Existing PBX calling line identification (ID) manipulation capabilities that would normally apply to outgoing trunk calls are not applied to the ELC calls. No special routing rules for routing the call within the PBX are required.

Referring now to the drawing figures in which like reference designators refer to like elements, there is shown in FIG. 1 a block diagram of an exemplary communication network constructed in accordance with the principles of the present invention and generally designated as system 10. System 10 includes a SIP core 12 that is in communication with at least one conventional PBX 14, and is typically in communication with a plurality of additional communication devices (not shown). The PBX 14 is a configurable switch that interconnects at least two user devices 16 and 18. The two user devices 16 and 18 may be wired or wireless telephone handsets and can be connected via the PBX to each other or to other devices via the PBX and the SIP core. The PBX 14 includes a memory 28 in communication with a processor 30. The memory 28 includes a list of ELC end users 32 and a list of ELC-to-SIP core line pairs 34. The SIP core 12 has service profiles 26 of each ELC end user. The SIP core 12 is a computing device that includes, among other things, a network interface, processor and memory (not shown) that are operable to allocate IMS services according to the service profile which lists IMS services available to a user.

When a call is initiated by a user device such as the user device 16 or the user device 18, the PBX 14 routes the call to its destination. For example, a local call connected between the user devices 16 and 18 may be set up and switched within the PBX 14. As shown in FIG. 1, either the originating user device or the destination user device may be designated as an ELC class of service device 16. More particularly, when a call is initiated, the processor 30 of the PBX 14 determines whether the call is local to the PBX and, if so, determines whether an originator of the call or the called party has an ELC class of service by accessing the ELC end users list 32. If either the caller or called party has an ELC class of service, the processor 30 accesses the list of ELC-to-SIP line pairs 34 to assign a first line pair 20 and a second line pair 22 for the call.

For example, assume that the user device 16 is the call originating device. The designation of the user device 16 as an ELC COS device triggers ELC processing of the call. When ELC processing of the call is invoked, an outgoing leg 20 of the call is established between the PBX 14 and the SIP core 12. Also, an incoming leg 22 of the call is established between the SIP core 12 and the PBX core 14. The SIP core 12 engages the IMS application server 24 in the call processing so that the IMS application server can implement the IMS services for the call.

The SIP core may be modified to include a service profile 26 for each end user that is ELC enabled for authorization and accounting purposes. The service profile may include information concerning which IMS services are available to a user. For instance, when an ELC call is invoked, the SIP core 12 may access a service profile 26 of the caller and of the called party to determine which IMS services are available to each party. The PBX itself does not have to be modified to implement the IMS services. For example, when a call recording function is invoked, the call recording function is implemented without control of the function by the PBX.

Figure 2:
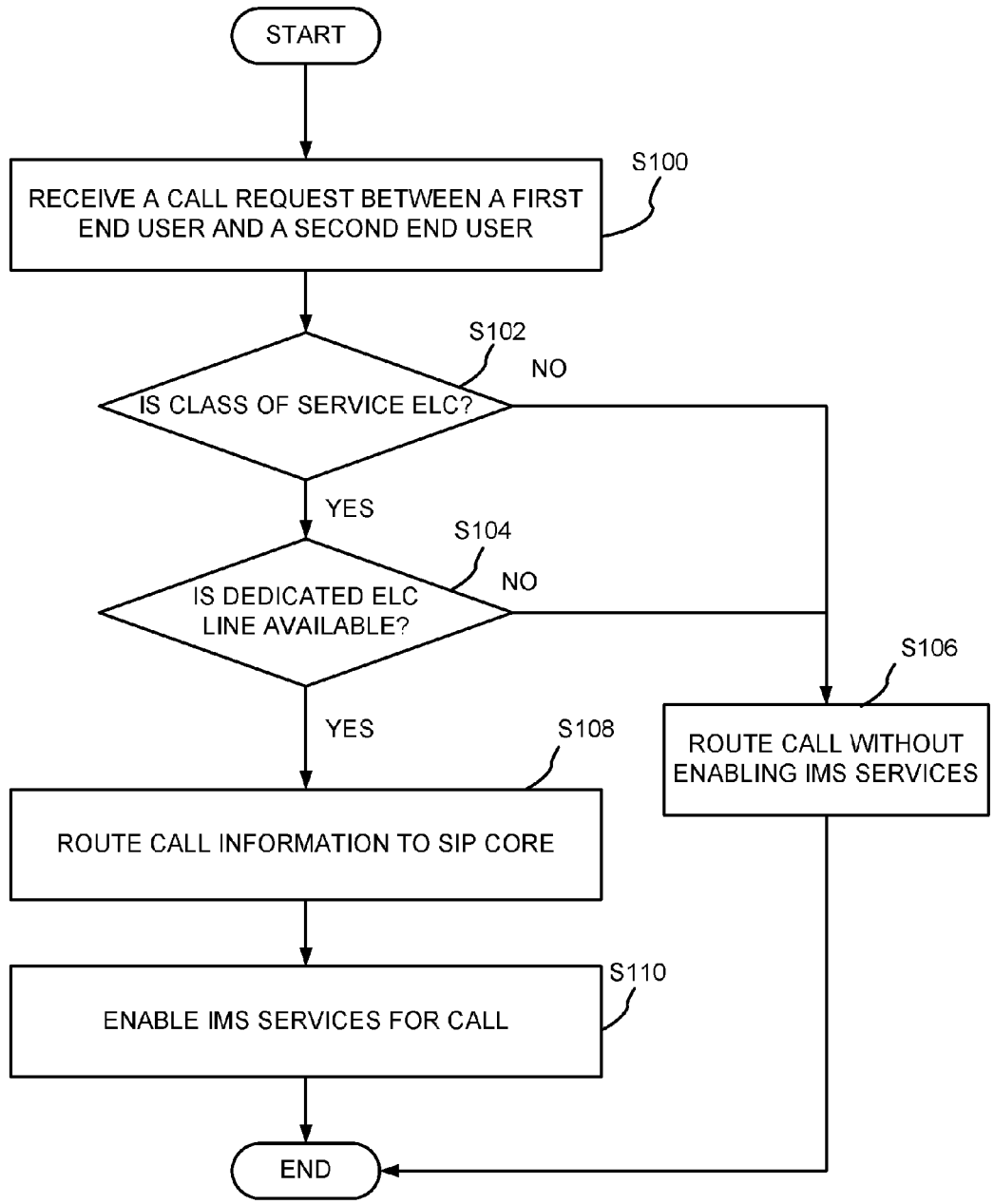
FIG. 2 is a flow chart of an exemplary process that enables IMS services to be provided to the local call within a conventional PBX.

FIG. 2 is a flow chart of an exemplary embodiment for call processing using a conventional PBX. When a call request between a first user and a second user is received (step S100), the system determines whether either the first user or second user has an ELC class of service (step S102). This may be done via the processor 30 of the PBX 14 accessing the ELC end users list 32. If neither the first or second user has an ELC COS, then the call is routed without enabling IMS services (step S106). If either the first or second user has an ELC COS, then the system determines whether a dedicated ELC line pair is available (step S104). This may be done via the processor 30 of the PBX 14 accessing the list of ELC to SIP line pairs 34. If a dedicated ELC line pair is not available, then the call is routed without enabling IMS services, i.e., conventionally (step S106). If a dedicated ELC line pair is available, the call is routed to the SIP core, (step S108) and IMS services are enabled (step S110), for what would have been a call switched locally within the PBX.

Figure 3:
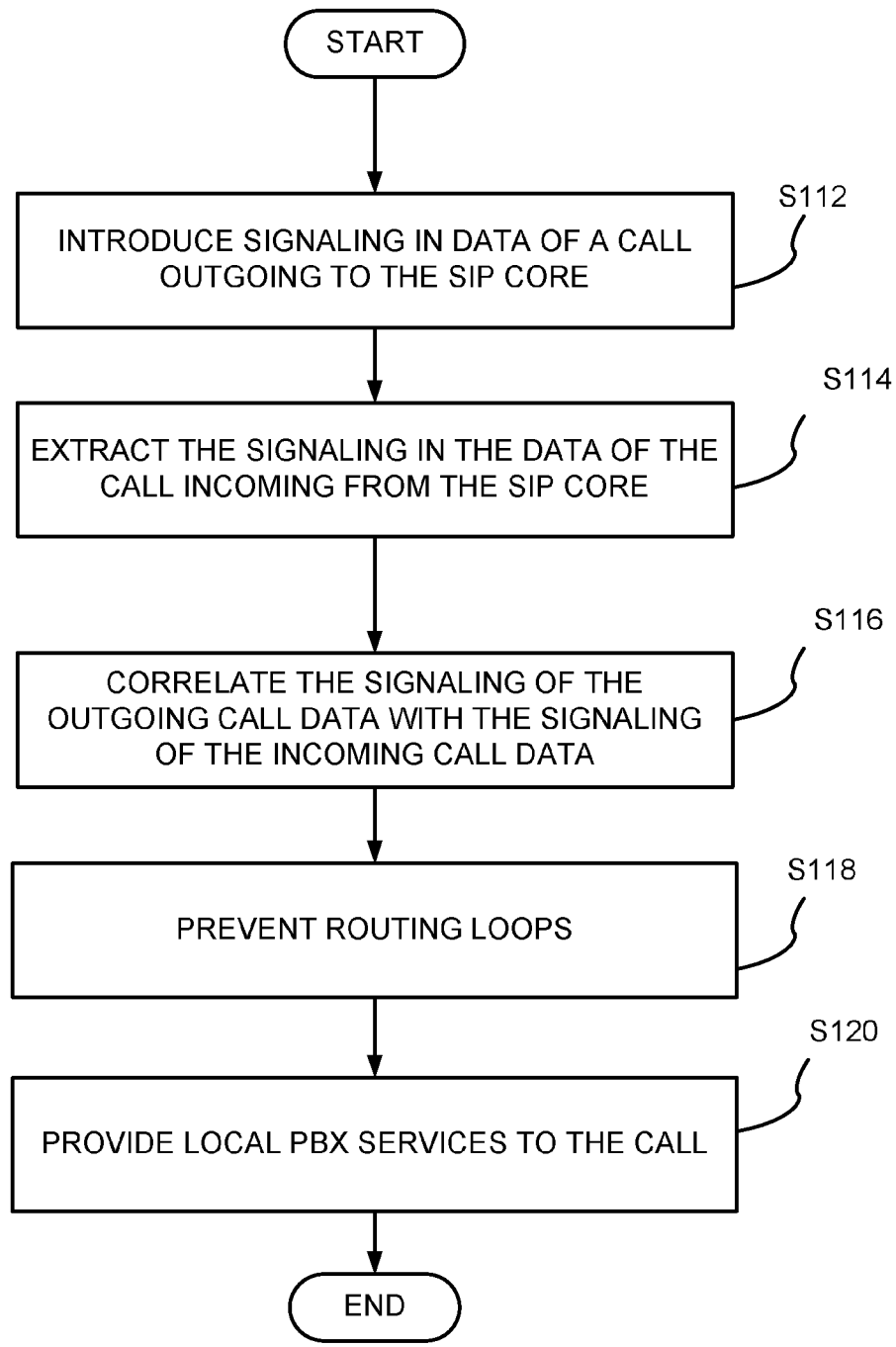
FIG. 3 is a flow chart of an exemplary embodiment for call processing using a conventional PBX

FIG. 3 is a flow chart of an exemplary embodiment for call processing in accordance with the present invention using a conventional PBX that has been modified with programmatic code to implement the functions described herein. When a call is to be routed to the SIP core 12 from the PBX 14, the PBX 14 introduces signaling into the data of the call (step S112). When the call data is returned from the SIP core 12 to the PBX 14, the signaling is extracted from the call data (step S114). The PBX 14 then correlates the signaling of the outgoing call data to the signaling of the incoming call data (step S116). The PBX 14 uses the correlated signals to prevent routing loops (step S118); and to provide local PBX services to the call (step S120). It is noted that ELC processing is applied by the PBX to a given call only once. Local PBX service may include bridged line appearances, boss-secretary filtering, ring again on no answer etc.

The arrangement described above enables IMS services to be integrated within a conventional PBX 14 without extensive PBX reprogramming. In particular, routing the call through the SIP core enables a first set of IP Multimedia Subsystem (IMS) services to be associated with an originating phase of the call and a second set of IMS services to be associated with a termination phase of the call, without control of the phases by the PBX 14. The IMS services may be rendered without changing the routing of a call in the PBX 14 and without PBX control of implementation of the IMS services. For example, when a user associated with a call initiates a three party call by adding a third end user local to the PBX 14 to the call, the PBX 14 establishes another outgoing/incoming leg pair between the PBX 14 and the SIP core 12, provided that either the initiating user or the third party has the ELC class of service. As another example, when an IMS application server 24 invokes call forwarding on behalf of a called party, the PBX 14 establishes, without knowledge of the invocation of the call forwarding, a connection to a forwarding address invoked on behalf of the called party. As yet another example, when an IMS application server 24 invokes an alternate identity to be transmitted to the called party on behalf of the calling party, the alternate identity is transmitted without knowledge of the alternate identity by the PBX 14. As another example, when an IMS application server 24 invokes a call waiting function on behalf of the called party, the call waiting function is implemented without control of the function by the PBX 14.

An incoming call received by the PBX from the SIP core in the context of ELC processing is distinguished from regular, non-ELC incoming calls. In addition, the outgoing and incoming call legs of an ELC call are correlated. In particular, ELC identification signaling is sent with the call information on the outgoing ELC call leg. The ELC identification signaling is extracted from the call information on the incoming ELC call leg. Matching identification signaling correlates the incoming and outgoing legs of an Exposed Local Call. If either of the call legs is modified by an end user (for example, by executing a PBX transfer or ad-hoc conference function), the ELC call topology is modified to reflect the change via standard SIP mechanisms. In other words, the PBX may correlate a different leg with the call based on the modification of the call parties by an end user.

The method described herein may be applied to all line types of a conventional PBX, not just SIP lines. The method does not introduce risk of adversely impacting the regular PBX translations and routing since it does not require changes to the PBX routing and digit manipulation configurations, and because it only applies to local calls. Nor does the method impact information displayed on an end user's display device. The present solution also keeps IMS applications "in the loop" when PBX transfer and ad-hoc conferencing are performed.

Because the ELC processing is applied on an individual basis for users having the ELC COS designation, and because a separate pool of ELC line pairs/trunks is provided, the regular trunks may not be exhausted. The method also provides a fall-back mechanism to regular (non-ELC) processing in the event that all ELC resources are exhausted. Also, the PBX vendor can price ELC licenses independent of the regular SIP virtual trunks/access ports. The arrangement avoids substantial PBX redesign that would be otherwise required to replace the conventional PBX full call model with the half call model.

The present invention can be realized in hardware, software, or a combination of hardware and software. Any kind of computing system, or other apparatus adapted for carrying out the methods described herein, is suited to perform the functions described herein.

A typical combination of hardware and software could be a specialized computer system, e.g., a PBX, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A call processing method, comprising:
   receiving a request for a call between a first end user local to a PBX and a second end user local to the PBX;
   determining whether a class of service for one of the first end user and the second end user is Exposed Local Call (ELC);
   determining if a dedicated ELC line pair connecting the PBX with a Session Initiation Protocol (SIP) core is available; and
   when a class of service for one of the first end user and the second end user is Exposed Local Call (ELC) and when a dedicated ELC line pair is available, then routing the call through the Session Initiation Protocol (SIP) core that is in communication with an Internet Protocol Multimedia Subsystem (IMS) application server to enable IMS services for the call.

2. The call processing method of claim 1, further comprising:
   when a dedicated ELC line pair connecting the PBX to the SIP core is not available for the call, then routing the call through the PBX without routing the call to the SIP core and without enabling IMS services for the call.

3. The call processing method of claim 1, further comprising:
   when a class of service for the first end user and the second end user is not ELC, then routing the call through the PBX without routing the call to the SIP core and without enabling IMS services for the call.

4. The call processing method of claim 1, further comprising, when the class of service for one of the first end user local to the PBX and the second end user local to the PBX is ELC, establishing a call between the two PBX users by establishing a first, outgoing, leg to the SIP core and establishing a second, incoming, leg from the SIP core, the outgoing and incoming legs each including an ELC line pair.

5. A call processing method, comprising:
   receiving a request for a call between a first end user local to a PBX and a second end user local to the PBX;
   determining whether a class of service for one of the first end user and the second end user is Exposed Local Call (ELC); and
   when a class of service for one of the first end user and the second end user is ELC, then routing the call through a Session Initiation Protocol (SIP) core that is in communication with an Internet Protocol Multimedia Subsystem (IMS) application server to enable IMS services for the call;
   when the class of service for one of the first end user local to the PBX and the second end user local to the PBX is ELC, establishing a call between the two PBX users by establishing a first, outgoing, leg to the SIP core and establishing a second, incoming, leg from the SIP core, the outgoing and incoming legs each including an ELC line pair; and
   adding signaling information to the call of the first, outgoing, leg to enable correlation between the first, outgoing, leg and the second, incoming leg.

6. The call processing method of claim 5, further comprising preventing a routing loop between the PBX and the SIP core based on the correlation between the first and second legs.

7. The call processing method of claim 5, further comprising providing local PBX services to the call between the first and second end users.

8. The call processing method of claim 4, wherein calling line identification manipulations are not applied to the call by the PBX.

9. A telecommunications system, comprising:
   a session initiation protocol (SIP) core to expose calls having an Exposed Local Call (ELC) class of service to IP Multimedia Subsystem (IMS) services;
   an IMS application server to provide IMS services to the calls routed through the SIP core; and
   a PBX having:
      a memory, the memory configured to store:
         a list of end users that have Exposed Local Call (ELC) class of service; and
         a list of ELC line pairs connecting the PBX with the session initiation protocol (SIP) core; and
      a processor in communication with the memory, the processor configured to:
         receive a request for a call session between a first end user local to the PBX and a second end user local to the PBX;
         determine whether a class of service for one of the first end user and the second end user is Exposed Local Call (ELC); and
         when a class of service for at least one of the first end user and the second end user is ELC, route the call through the SIP core.

10. The system of claim 9, wherein the processor is further configured to determine whether an ELC line pair is available for the call, and when an ELC line pair is not available for the call, then the processor routes the call through the PBX and not through the SIP core.

11. The system of claim 9, wherein routing of the call through the SIP core enables a first set of IMS services to be associated with an originating phase of the call and a second set of IMS services to be associated with a termination phase of the call, without control of the originating and terminating phases by the PBX.

12. The system of claim 11, wherein the first set of IMS services and the second set of IMS services are implemented without changing PBX routing.

13. A private branch exchange (PBX), comprising:
   a processor configured to:
      determine when a user associated with a call originating at the PBX and terminating at the PBX is a user having an Exposed Local Call (ELC) class of service;

determine if a dedicated ELC line pair connecting the PBX with a Session Initiation Protocol (SIP) core is available; and establish, via the dedicated ELC line pair, a first leg and a second leg between the PBX and the session initiation protocol (SIP) core when the user has the ELC class of service.

14. The PBX of claim 13, wherein the processor is further configured to:

introduce signaling in data of the call outgoing to the SIP core;

extract signaling in data of the call incoming from the SIP core; and correlate the outgoing call signaling with the incoming call signaling to prevent a routing loop between the PBX and the SIP core and to provide local PBX services to the call.

15. The PBX of claim 13, wherein at least one IP Multimedia Subsystem (IMS) service is implemented for the call without PBX control of the implementation of the services.

16. The PBX of claim 13, wherein a first set of one or more IP Multimedia Subsystem (IMS) services associated with an originating phase of the call and a second set of one or more IMS services associated with a terminating phase of the call without the PBX controlling the association of the services.

17. The PBX of claim 13, wherein, when a user associated with the call initiates a three party call by adding a third end user local to the PBX to the call, the PBX establishes another outgoing-incoming call leg pair between the PBX and the SIP core, provided that one of the initiating user and the third party has the ELC class of service.

18. The PBX of claim 13, wherein, when an Internet Protocol Multimedia Subsystem (IMS) application server in communication with the SIP core invokes call forwarding on behalf of a called party, the PBX establishes, without knowledge of the invocation of the call forwarding, a connection to a forwarding address invoked on behalf of the called party.

19. The PBX of claim 13, wherein, when an Internet Protocol Multimedia Subsystem (IMS) application server in communication with the SIP core invokes an alternate identity to be transmitted to the called party on behalf of the calling party, the alternate identity is transmitted without knowledge of the alternate identity by the PBX.

20. The PBX of claim 13, wherein, when an Internet Protocol Multimedia Subsystem (IMS) application server in communication with the SIP core invokes a call waiting function on behalf of the called party, the call waiting function is implemented without control of the function by the PBX.

* * * * *